US012252376B2

(12) United States Patent
Siironen et al.

(10) Patent No.: US 12,252,376 B2
(45) Date of Patent: Mar. 18, 2025

(54) METHOD FOR RELEASING SAFETY GEARS, AND A STALLING DETECTOR

(71) Applicant: KONE Corporation, Helsinki (FI)

(72) Inventors: Tapio Siironen, Helsinki (FI); Tapani Talonen, Helsinki (FI); Tarvo Viita-aho, Helsinki (FI)

(73) Assignee: KONE CORPORATION, Helsinki (FI)

( * ) Notice: Subject to any disclaimer, the term of this patent is extended or adjusted under 35 U.S.C. 154(b) by 923 days.

(21) Appl. No.: 17/184,727

(22) Filed: Feb. 25, 2021

(65) Prior Publication Data

US 2021/0284499 A1 Sep. 16, 2021

(30) Foreign Application Priority Data

Mar. 10, 2020 (EP) .................................... 20161974

(51) Int. Cl.
*B66B 5/02* (2006.01)
*B66B 3/00* (2006.01)
*B66B 7/12* (2006.01)

(52) U.S. Cl.
CPC .............. *B66B 5/027* (2013.01); *B66B 3/002* (2013.01); *B66B 7/1215* (2013.01)

(58) Field of Classification Search
CPC ......... B66B 5/027; B66B 5/0031; B66B 5/04; B66B 5/0037; B66B 5/18; B66B 11/0415; B66B 5/0018; B66B 5/16; B66B 11/04; B66B 3/002; B66B 5/005; B66B 5/044; B66B 7/08; B66B 1/365; B66B 11/0035; B66B 11/08; B66B 5/0087; B66B 5/02; B66B 5/028; B66B 7/06; B66B 7/10; B66B 7/1215; B66B 1/32
See application file for complete search history.

(56) References Cited

U.S. PATENT DOCUMENTS

2011/0088980 A1 4/2011 Husmann

FOREIGN PATENT DOCUMENTS

| | | | | | |
|---|---|---|---|---|---|
| BR | PI0415952 | A | * | 1/2007 | |
| CN | 201240728 | Y | | 5/2009 | |
| CN | 106976779 | A | * | 7/2017 | ............... B66B 5/02 |
| CN | 109071167 | A | * | 12/2018 | ........... B66B 5/0031 |
| CN | 109335912 | A | * | 2/2019 | ............. B66B 5/044 |
| CN | 109678025 | A | * | 4/2019 | ............. B66B 5/044 |
| CN | 111153303 | A | * | 5/2020 | |
| CN | 113371567 | A | * | 9/2021 | ............. B66B 3/002 |
| DE | 11 2017 004 032 | T5 | | 5/2019 | |
| FI | 122393 | B | * | 12/2011 | |

(Continued)

OTHER PUBLICATIONS

European Search Report of application 20 16 1974.9, dated Sep. 28, 2020.

*Primary Examiner* — Jeffrey Donels
(74) *Attorney, Agent, or Firm* — Birch, Stewart, Kolasch & Birch, LLP

(57) ABSTRACT

A method for releasing safety gears of an elevator car or a counterweight of an elevator system, the elevator system including a stalling detector coupled to compensation roping associated with the elevator car and the counterweight and configured to detect an increased rope tension, includes preventing a stalling indication from the stalling detector during a rescue operation; and moving the elevator car in order to release the safety gears.

20 Claims, 3 Drawing Sheets

(56) References Cited

FOREIGN PATENT DOCUMENTS

| | | | | | |
|---|---|---|---|---|---|
| JP | 3313021 | B2 | | 6/2002 | |
| JP | 2012-162387 | A | | 8/2012 | |
| JP | 2016-141519 | A | | 8/2016 | |
| WO | WO-03033389 | A1 | * | 4/2003 | ............. B66B 5/027 |
| WO | WO-2005040026 | A1 | * | 5/2005 | ............. B66B 5/027 |
| WO | WO-2005115902 | A1 | * | 12/2005 | ........... B66B 5/0037 |
| WO | WO-2009153353 | A1 | * | 12/2009 | ............... B66B 7/10 |
| WO | WO-2018054927 | A1 | * | 3/2018 | ............. B66B 11/02 |
| WO | WO-2018059945 | A1 | * | 4/2018 | ........... B66B 1/3446 |
| WO | WO-2019111404 | A1 | * | 6/2019 | ............... B66B 5/02 |
| WO | WO-2023198954 | A1 | * | 10/2023 | |

* cited by examiner

METHOD FOR RELEASING SAFETY GEARS, AND A STALLING DETECTOR

TECHNICAL FIELD

The present application relates to the field of elevator systems, and more particularly to a method for releasing safety gears, and to a stalling detector.

BACKGROUND

Elevator car safety gear is a safety device that stops an elevator car when it is traveling at a speed that exceeds the overspeed limit set for the elevator. In a typical safety gear arrangement, a pair of safety gears, one at each side of the elevator car facing a guide rail, is activated upon overspeed detection to grip the guide rails to stop the elevator car. The wedging action of the safety gear tightens the grip of the safety gear on the guide rail as the elevator car advances until the greatest allowed deceleration rate is reached. After coming to a halt, the safety gear holds the car tightly in its place until the grip is released by backing the car from the position it has stopped in until the safety gear wedges disengage from the guide rails. In some applications, e.g. marine elevators, the counterweight may have its own overspeed detection and safety gears. In some applications, a two-way safety gear may be applied, and there is an overspeed limit for upward as well as downward travel.

Releasing, i.e. disengaging, a safety gear after a downward gripping is trivial by using the hoisting machinery to lift the gripping party—the elevator car or the counterweight. However, after an upward gripping, the elevator car or the counterweight ought to be moved downward which may be impossible due to an imbalance between the elevator car and counterweight sides of the elevator. For example, if the elevator car is high in the shaft, nearly all of the hoisting rope weight is on the counterweight side and the remaining load on the car side may not be enough to release the tight grip of the safety gear. This situation is greatly helped if the elevator has compensation roping to cancel the varying imbalance between the elevator car and counterweight sides of the elevator. The compensation rope runs from the bottom of the elevator car via a tensioning pulley at the bottom of the shaft to the bottom of the counterweight, keeping the weight of the roping always in balance. In case of, for example, an upward gripping elevator car, the compensation rope can be used for pulling the car down by a service person at the bottom of the shaft. However, shaft entry always entails safety risks for the service personnel.

Elevator stalling detection is a safety measure for monitoring that the weight of the elevator car and counterweight continuously maintain the tension in the hoisting members, i.e. hoisting ropes or belts. The hoisting member tension is essential for having an adequate traction between the traction sheave and the hoisting members, and for ensuring that the hoisting members remain taut at their intended routing. Should it be detected by a stalling detection that the weight of the elevator car or the counterweight no longer loads the hoisting member, the elevator is immediately immobilised until a service person has found and cleared the reason for the stalling detection and reset the elevator to a normal drive mode.

In an elevator with compensation roping, a rescue operation to release passengers from an immobilised elevator car after safety gear gripping upwards could be carried out by driving the gripping party downwards with the hoisting machinery: the gripping party will be pulled down by the compensation roping when the opposing party is pulled up by the hoisting machinery. However, the stalling detection will detect an increasing compensation rope tension and immobilises the elevator because of the risk of elevator stalling by slack hoisting rope on the gripping side.

Elevator systems comprising high friction hoisting members require a detection system for detecting when an elevator car or a counterweight associated with the elevator car is climbing. This refers to situations where the elevator car or the counterweight is gripping or driving into end buffers in an elevator pit. In response to the induced sudden strike, the elevator car and/or the counterweight may bounce. This may cause loosening of ropes associated with the elevator car such that eventually the elevator car starts to fall by gravity as there is no longer tension in the ropes to lift the elevator car. For safety, the detection system shuts down the elevator machinery after detecting changes in the rope tension. The sudden and rapid movements may further trigger an elevator safety gear that engages to the elevator car and prevents it from moving.

To release the elevator car, the elevator car needs to move downwards so that the safety gears may disengage. This may require high forces depending on the structure of the safety gear solution. Releasing the elevator car may be difficult when the elevator car has stopped between floors, making it impossible to add weight to the elevator car.

SUMMARY

It is an objective to provide a method and an apparatus for rescue operation for an elevator system. The objective is achieved by the features of the independent claims. Some example embodiments are described in the dependent claims.

According to a first aspect, there is provided a method for releasing safety gears an elevator car or a counterweight of an elevator system, the elevator system comprising a stalling detector coupled to compensation roping associated with the elevator car and the counterweight and configured to be activated in response to detecting an increased rope tension. The method comprises preventing a stalling indication from the stalling detector during a rescue operation; and moving the elevator car in order to release the safety gears.

In an example embodiment, preventing a stalling indication from the stalling detector during a rescue operation comprises setting the stalling detector in a rescue mode that prevents the stalling indication from the stalling detector during the rescue operation.

In an example embodiment, setting the stalling detector in a rescue mode that prevents the stalling indication from the stalling detector during the rescue operation comprises locking the stalling detector in place with at least one of electromechanical and electrical means.

In an example embodiment, in addition or alternatively, the method further comprises monitoring the stalling detector so that the elevator car cannot be taken into normal use when the stalling detector is locked or set to the rescue mode.

In an example embodiment, in addition or alternatively, moving the elevator car in order to release the safety gears comprises moving the elevator car manually by pulling the elevator car downwards from the compensation roping.

In an example embodiment, in addition or alternatively, moving the elevator car in order to release the safety gears comprises moving the elevator car with elevator machinery.

In an example embodiment, in addition or alternatively, the stalling detector is configured in one of a diverting pulley, a car pulley and a rope termination point.

In an example embodiment, preventing a stalling indication from the stalling detector during a rescue operation comprises: obtaining, by an elevator safety controller, the stalling indication from the stalling detector; and overriding, by the elevator safety controller, the stalling indication during the rescue operation.

According to a second aspect, there is provided a stalling detector coupled to compensation roping associated with an elevator car and a counterweight of an elevator system. The stalling detector is configured to detect an increased rope tension of the compensation roping; and enable prevention of sending a stalling indication in response to the detection during a rescue operation, the prevention enabling movement of the elevator car in order to release safety gears of the elevator car or the counter-weight.

In an example embodiment, the stalling detector is configured to be set in a rescue mode that prevents sending of the stalling indication during the rescue operation.

In an example embodiment, the stalling detector is configured to be lockable in place during the rescue operation with at least one of electrical or mechanical means.

In an example embodiment, in addition or alternatively, the stalling detector is configured in one of a diverting pulley, a car pulley and a rope termination point.

In an example embodiment, in addition or alternatively, the stalling detector is coupled to a swing arm.

According to a third aspect, there is provided an elevator system comprising an elevator car; a counter-weight; compensation roping associated with the elevator car and the counter-weight; safety gears associated with the elevator car or its associated counterweight; and the stalling detector of the second aspect. The elevator car is configured to be moved in order to release the safety gears.

According to a fourth aspect, there is provided an apparatus for releasing safety gears of an elevator car or a counterweight of an elevator system, the elevator system comprising a stalling detector coupled to compensation roping associated with the elevator car and the counterweight and configured to detect an increased rope tension. The apparatus is configured to prevent a stalling indication from the stalling detector during a rescue operation; and enable movement of the elevator car in order to release the safety gears.

In an example embodiment, the apparatus is further configured to monitor the stalling detector so that the elevator car cannot be taken into normal use when the stalling detector is locked or set to the rescue mode.

In an example embodiment, the apparatus is further configured to obtain the stalling indication from the stalling detector; and override the stalling indication during the rescue operation.

In an example embodiment, the apparatus is further configured to monitor the stalling detector so that the elevator car cannot be taken into normal use when the stalling detector is locked or set to the rescue mode.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The solution presented below provides a solution to release safety gears of an elevator car or counterweight in a rescue situation.

Figure 1:
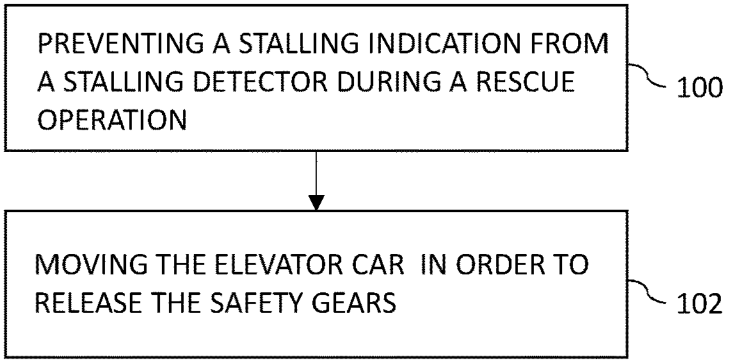
FIG. 1 illustrates a method for releasing safety gears of an elevator car of an elevator system according to an example embodiment.

FIG. 1 illustrates a method for releasing safety gears of an elevator car of an elevator system according to an example embodiment.

The method may be applied in an elevator system comprising a stalling detector coupled to compensation roping associated with the elevator car and counterweight and configured to detect an increased rope tension. At 100 a stalling indication from the stalling detector is prevented during the rescue operation, and at 102 the elevator car is moved in order to release the safety gears. The movement may be provided by elevator machinery configured to move the elevator car in an elevator shaft. Alternatively, the movement may be provided by manually pulling the elevator car down with the compensation roping.

Figure 2A:
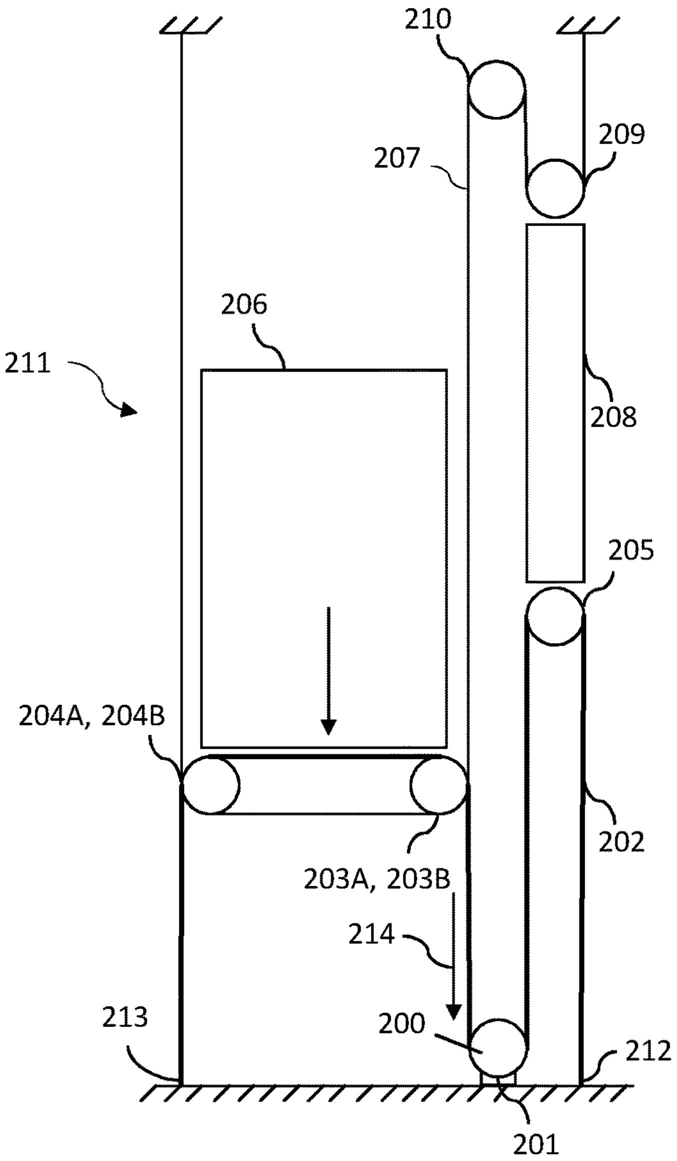
FIG. 2A illustrates an elevator system comprising an apparatus configured to detect an increase in tension of compensation roping according to an example embodiment.

FIG. 2A illustrates an elevator system 211 comprising a stalling detector 200 according to an example embodiment. The elevator system 211 may be implemented with ropings 202, 207 of any reeving factor, such as 2:1 or 1:1.

The elevator system 211 comprises a counterweight 208 and elevator machinery configured to move an elevator car 206 in an elevator shaft. The machinery may comprise, for example, a motor and a traction sheave 210 for lifting the elevator car 206. For illustrative purposes, only the traction sheave 210 is shown in FIG. 2A. The elevator car 206, the machinery and the counterweight 208 are interconnected via hoisting roping 207 routed via a plurality of pulleys 201, 203A, 204A, 209 and a sheave 210.

The compensation roping 202 is used in conjunction with the hoisting roping 207 to cancel the varying imbalance between the elevator car 206 and counterweight sides of the elevator car 206 caused by the imbalance of the weight of the hoisting roping 207, especially in extreme positions of the elevator car 206 and the counterweight 208. The compensation roping 202 may be suspended below the elevator car 206 and the counterweight 208. The compensation roping 202 may comprise a plurality of pulleys 201, 203B, 204B, 205. The ropings 202, 207 may be implemented with any known solution, such as steel ropes, belts, polyurethane coated ropes, high friction ropes made with special grease, or cogged belts.

The elevator system 211 further comprises a stalling detector 200. The stalling detector 200 may comprise a monitoring device (not shown in FIG. 2A). The monitoring device may be coupled with the compensation roping 202 of the elevator system 211. The monitoring device may be configured to detect changes in rope tension which indicate abnormality in the movements of the elevator car 206 or the counterweight 208. For example, the monitoring device may detect when the rope tension exceeds a predetermined threshold. Alternatively, the monitoring device may be configured to detect any change in the rope tension and/or position of the stalling detector 200.

The changes in the rope tension may be detected, for example, with a force sensor. Alternatively, the changes in the rope tension may be detected with a sensor configured to detect changes in position of the stalling detector 200. Alternatively, the sensor may be configured to detect tension force or force applied in response to the pulley resisting the upward movement. In an example embodiment, the stalling detector 200 may be configured in the diverting pulley 201 of the compensation roping 202. The diverting pulley 201 may be either fixed or movable, such as a tensioning pulley. Alternatively, the stalling detector 200 may be configured in at least one of the car pulleys 203, 204. The stalling detector 200 may also be configured in different locations in the elevator system 211, for example, in connection with the compensation roping 202. The stalling detector 200 may be configured to detect movement of the pulley associated with the stalling detector 200. The movement may be essentially orthogonal with respect to the rotating axle of the pulley. The stalling detector 200 may comprise a switch, which opens in response to the detected abnormal movement or tension and shuts down the machinery and applies machinery brakes. In an example embodiment, the stalling detector 200 may move a predetermined distance before the switch is triggered.

The stalling detector 200 may be coupled to a fixed support. For example, one possible option is to arrange the stalling detector 200 at any of the rope termination points 212, 213, for example, as a force sensor. Alternatively, the stalling detector 200 may be movable such that it is arranged to move in response to an increased tension on the compensation roping 202. Further, the stalling detector 200 may be arranged to be movable only for a predetermined distance. For example, when releasing the elevator car 206 from safety gear gripping by moving the counterweight upwards, the movement is also induced via the compensation roping 202 to the diverting pulley 201 comprising the stalling detector 200. In a normal operation, the diverting pulley 201 may stay still, that is, it does not move up or down, and the pulley 201 may only have rotating motion. When the diverting pulley 201 is fixed, or if it may move only a limited distance, its restricted upward motion indicates a higher tension in the compensating roping 202. The stalling detector 200 configured to the diverting pulley 201 may detect the increased tension and the stalling detector 200 may cause the elevator machinery to stop and machinery brakes to activate. The detection may be performed, for example, by a force sensor or by a switch activated by the movement of the diverting pulley 201. For example, the diverting pulley 201 may move and physically contact the switch when a certain amount of movement has been reached. The elevator car 206 may remain inoperable until the stalling detection condition is reset by a service person.

Figure 2B:
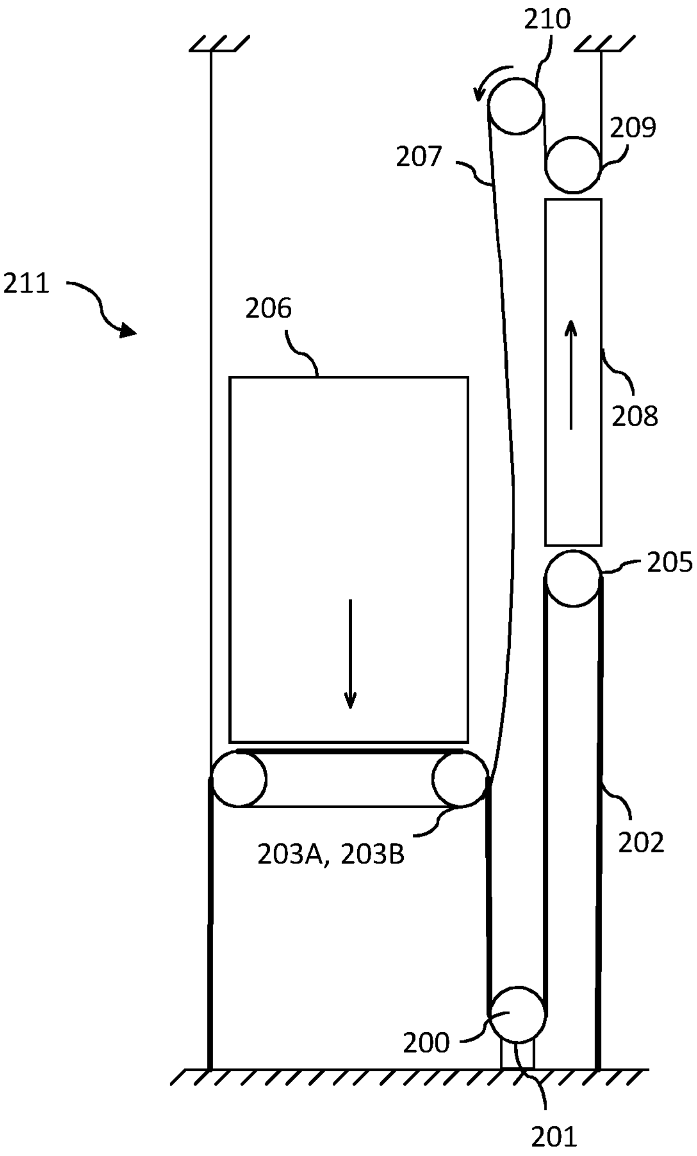
FIG. 2B illustrates a rescue method for releasing safety gears of an elevator car according to an example embodiment.

FIG. 2B illustrates a rescue method for releasing safety gears of an elevator car 206 according to an example embodiment. The elevator system 211 illustrated in FIG. 2B corresponds to the elevator system 211 of FIG. 2A.

In the exemplary situation presented in FIG. 2B, the safety gears (not shown in FIG. 2B) have engaged in response to the elevator car 206 overspeeding in the upward direction. The safety gears may be bi-directional safety gears. In order to carry out a rescue operation and disengage the safety gear, the elevator car 206 needs to be moved downwards. An attempted downward movement of the elevator car 206 may cause strain to the compensation roping 202 which is detected by the stalling detector 200. Therefore, the elevator car 206 may not move downwards using the motor, which is shut down in response to the stalling detection.

The rescue operation may be enabled by preventing a stalling indication from the stalling detector 200 during a rescue operation. In an example embodiment, the stalling detector 200 may be set to a rescue mode. In another example embodiment, the stalling detector 200 may be locked in place mechanically or electromechanically. In the rescue mode, the operation of the stalling detector 200 may be deactivated. Hence, while in the rescue mode, the pulley associated with the stalling detector 200 may still rotate although the position of the pulley may not change in the rescue mode. In another example embodiment, the stalling detector 200 may be configured such that it can move, for example, vertically for a predetermined distance before stalling detection indication. For example, a detection switch may be positioned such that it detects movement of the stalling detector only after the stalling detector has reached a preset moving limit distance. By preventing or deferring the stalling detection, the movement of the elevator car 206 is not prevented during the rescue operation. Therefore, the elevator may be able to drive itself out from the gripping situation in either direction.

In another example embodiment, the stalling indication may be bypassed electrically. In another example embodiment, the stalling indication signal may be registered but ignored by a computer program running in an apparatus, for example, an elevator safety controller. In other words, the elevator safety controller may obtain the stalling indication from the stalling detector, and override the stalling indication during the rescue operation. Further, in an example embodiment, the elevator safety controller may be configured to monitor the stalling detector so that the elevator car cannot be taken into normal use when the stalling detector is locked or set to the rescue mode.

The stalling detector 200 may be set to the rescue mode or locked manually or automatically. A supervision may be needed for locking the stalling detector 200 so that the elevator car 206 cannot be taken into normal use when the stalling detector 200 is locked or in the rescue mode. When the elevator pit is not accessible for a service man, it may be useful that the setting or locking and moving operations may be performed remotely.

If the elevator car 206 is stuck very heavily in the upwards direction, the rescue may be performed by pulling the elevator car 206 downwards using the compensation roping 202. The pulling may be performed, for example, with a separate tool, such as a hoist, or by moving the elevator with the machinery. The manual pulling may require opening of the machinery brakes, and therefore the activation of the stalling detector 200 may need to be prevented also in this case. The elevator car 206 may be released from the safety gear engagement, for example, by pulling downwards from a rescue point 214 as illustrated with an associated arrow in FIG. 2A.

In the next sections, some examples of possible implementation forms of the stalling detector are described in detail. The arrangements enable preventing the stalling detection during a rescue operation by restricting the movement of the stalling detector. The restricted movement may prevent the stalling detector from detecting the increased tension of the compensation roping when the tension is caused by the rescue operation.

Figure 3:
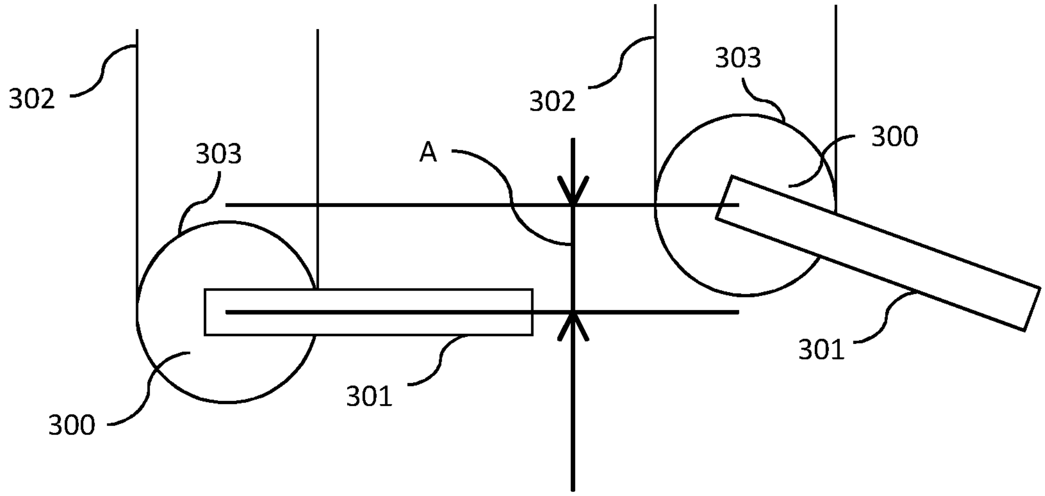
FIG. 3 illustrates an apparatus arranged to have restricted movement according to an example embodiment.
Figure 4:
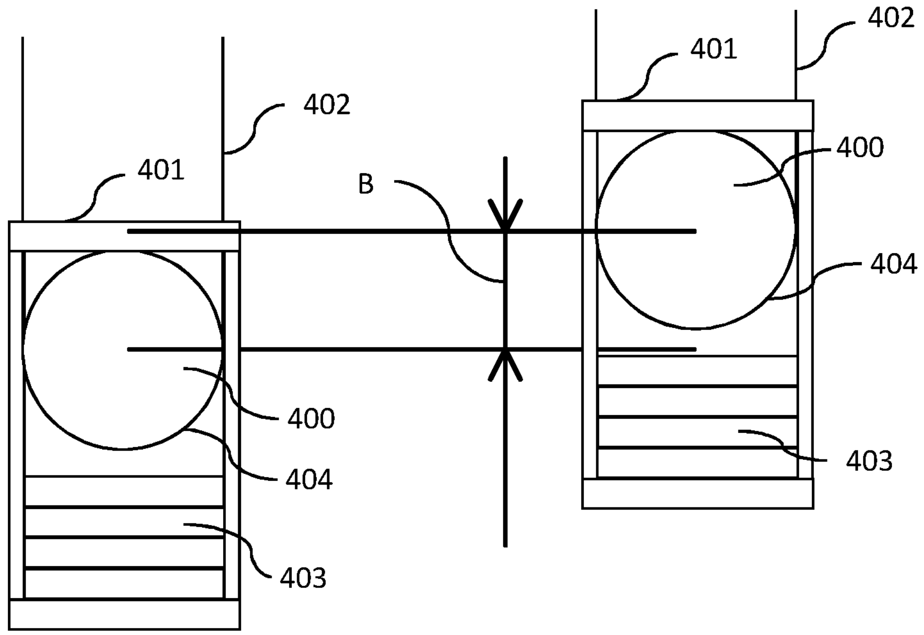
FIG. 4 illustrates an apparatus arranged to have restricted movement according to another example embodiment.

FIGS. 3 and 4 illustrate a stalling detector 300, 400 arranged to have a restricted movement according to example embodiments. The example e embodiments enable preventing a stalling indication from the stalling detector during a rescue operation by a restricting movement of the stalling detector 300, 400. The restricted movement may prevent the stalling detector to detect the increased tension of the compensation roping when the tension is caused by the rescue operation.

The stalling detector 300, 400 may be coupled to compensation roping 302, 402 of an elevator system. The stalling detector 300, 400 may comprise a monitoring device, such as a switch or sensor, to trigger safety functions in response to increased strain of the compensation roping 302, 402. The stalling detector 300, 400 may be coupled, for example, to a diverting pulley 303, 404 of the compensation roping 302, 402.

The stalling detector 300, 400 may be arranged such that it may allow some vertical movement before stalling detection by a sensor or a switch. In an example embodiment, the stalling detector 300 may be implemented with a swing arm 301, as illustrated in FIG. 3. The swing arm 301 may be configured to suspend the stalling detector 300 from a shaft wall or floor of the elevator pit such that a restricted movement is allowed for the stalling detector 300. For example, the swing arm 301 may be arranged to enable movement of the stalling detector 300 for a predetermined distance A before the switch is activated. Because the arrangement allows the stalling detector 300 to move for the predetermined distance A, the switch is not immediately triggered when the tension of the compensation roping 302 increases. This is because the stalling detector 300, 400 may not detect a force exceeding a threshold limit as the diverting pulley/stalling detector 300 moves in response to the induced force. When the predetermined distance A is reached, the diverting pulley 303 may stop moving and a stalling indication may be provided by the stalling detector 300. In an example embodiment, the movement of the stalling detector 300 or the diverting pulley 303 may be restricted or the stalling detector 300 or diverting pulley 303 may be locked in place in order to prevent the stalling indication from the stalling detector 300 during the rescue operation. The locking may be implemented, for example, with at least one of electromechanical and electrical means. In another example embodiment, the stalling detector 300 may be set in a rescue mode that prevents the stalling indication from the stalling detector 300 during the rescue operation.

FIG. 4 illustrates another possible implementation of a support structure for the stalling detector 400 according to an example embodiment. In FIG. 4, the stalling detector 400 and the associated pulley may be arranged in a casing 401. The casing 401 may comprise one or more weight or spring elements 403 to maintain a suitable tension in the compensation roping 402. When the tension of the compensation roping 402 increases and a lifting force is applied to the pulley, the stalling detector 400 and the support structure 401 start to move upwards. In other words, the stalling detector and the associated pulley may be vertically movable. The stalling detector 400 may be configured such that only after the vertical movement exceeds a predetermined distance B, the stalling detector 400 provides a stalling indication. As discussed relating to FIG. 3, in an example embodiment, the movement of the stalling detector 400 or the diverting pulley 404 may be restricted or the stalling detector 400 or diverting pulley 404 may be locked in place in order to prevent the stalling indication from the stalling detector 400 during the rescue operation. The locking may be implemented, for with example, at least one of electromechanical and electrical means. In another example embodiment, the stalling detector 400 may be set in a rescue mode that prevents the stalling indication from the stalling detector 400 during the rescue operation.

In FIGS. 3 and 4, the allowed movement is illustrated as distances A, B between the arrows. The distances A, B may be measured from the center of the stalling detector 300, 400 at a starting position corresponding to the location of the stalling detector 300, 400 and the associated pulley in a normal operation (left side of FIGS. 3 and 4) to the center of the stalling detector 300, 400 at a second position during an abnormal operation (right side of FIGS. 3 and 4). The stalling detector 300, 400 may move from the starting position to the second position in response to an increased tension of the compensation roping 402. The stalling detector 300, 400 may move a predetermined distance A, B before indicating stalling detection or a monitoring device does not trigger the switch during the rescue operation, while still being capable of detecting situations where the safety functions need to be activated. For example, when the elevator car is moved during the rescue operation, a movement within the predetermined distance A, B may be enough to disengage the safety gears.

Although the embodiments and examples above discuss the elevator car and its associated safety gear, the same principles apply also to the counterweight of the elevator and to the safety gear associated with the counterweight.

Although two examples were illustrated for arranging the stalling detector with a limited movement, also other arrangements are possible. Further, although a diverting pulley was used as an example with which the stalling detector may be associated, any pulley of the compensation roping of the elevator system or a rope termination point may be used instead.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for releasing engaged safety gears of an elevator car or a counterweight of an elevator system, the elevator system comprising an elevator car, a hoisting machinery, a counterweight and a stalling detector coupled to compensation roping associated with the elevator car and the counterweight, the method comprising:

monitoring tension in the compensation rope;

providing a stalling indication to interrupt power to the hoisting machinery upon detection of increased compensation rope tension;

preventing the stalling indication from the stalling detector during releasing of the engaged safety gears; and moving the elevator car downwards in order to release the engaged safety gears.

2. The method of claim 1, wherein preventing a stalling indication from the stalling detector during the releasing of the engaged safety gears comprises setting the stalling detector in a rescue mode that prevents the stalling indication from the stalling detector.

3. The method of claim 2, wherein setting the stalling detector in a rescue mode that prevents the stalling indication from the stalling detector comprises locking the stalling detector in place with at least one of electromechanical and electrical means.

4. The method of claim 2, further comprising:

monitoring the stalling detector so that the elevator cannot be taken into normal use when the stalling detector is locked or set to the rescue mode.

5. The method of claim 1, wherein moving the elevator car downwards in order to release the engaged safety gears comprises moving the elevator car manually by pulling the elevator car downwards by the compensation roping.

6. The method of claim 5, wherein pulling the elevator car downwards by the compensation roping comprises pulling the elevator car with the hoisting machinery.

7. The method of claim 1, wherein the stalling detector is configured in one of a diverting pulley, a car pulley and a rope termination point.

8. The method of claim 1, wherein preventing a stalling indication from the stalling detector during the releasing of the engaged safety gears comprises:

obtaining, by an elevator safety controller, the stalling indication from the stalling detector; and overriding, by the elevator safety controller, the stalling indication during the releasing of the engaged safety gears.

9. The method of claim 3, further comprising:

monitoring the stalling detector so that the elevator car cannot be taken into normal use when the stalling detector is locked or set to the rescue mode.

10. The method of claim 2, wherein moving the elevator car in order to release the safety gears comprises moving the elevator car manually by pulling the elevator car downwards from the compensation roping.

11. The method of claim 3, wherein moving the elevator car in order to release the safety gears comprises moving the elevator car manually by pulling the elevator car downwards from the compensation roping.

12. The method of claim 2, wherein moving the elevator car in order to release the safety gears comprises moving the elevator car with elevator machinery.

13. A stalling detector coupled to compensation roping associated with an elevator car and a counterweight of an elevator system, the stalling detector being operable in a normal operation mode and in a rescue mode, and being configured to:

detect and indicate an increased rope tension of the compensation roping when operating in a normal operation mode; and prevent detection or indication of an increased rope tension of the compensation roping when operating in a rescue mode.

14. The stalling detector of claim 13, wherein the stalling detector is configured to be lockable in place in the rescue mode with at least one of electrical or electromechanical means.

15. The stalling detector of claim 13, wherein the stalling detector is configured in one of a diverting pulley, a car pulley and a rope termination point.

16. The stalling detector of claim 13, wherein the stalling detector is coupled to a swing arm.

17. The stalling detector of claim 13, further comprising:

a switch; and an element configured to be attached to a pulley of the compensation roping, wherein movement of the element activates the switch.

18. The stalling detector of claim 17, wherein the switch is a sensor.

19. An elevator system comprising:

an elevator car;

a counter-weight;

compensation roping-associated with the elevator car and counter-weight;

safety gears associated with the elevator car or its associated counterweight; and the stalling detector of claim 13, wherein the elevator car is configured to be moved in order to release the safety gears.

20. An apparatus for releasing safety gears of an elevator car or a counterweight of an elevator system, the elevator system comprising a stalling detector coupled to compensation roping associated with the elevator car and the counterweight and configured to detect an increased rope tension, the apparatus being configured to:

prevent a stalling indication from the stalling detector during a rescue operation; and enable movement of the elevator car in order to release the safety gears.

* * * * *